United States Patent
Tadera et al.

[19]

[11] Patent Number: 6,155,511
[45] Date of Patent: Dec. 5, 2000

[54] CAPSTAN MOTOR WITH HYSTERESIS PLATE AND DRIVE SYSTEM

[75] Inventors: Takamitsu Tadera, Tenri; Koji Yamabuchi, Nara; Mitsunobu Yoshida, Tenri, all of Japan

[73] Assignee: Sharp Kabushiki Kaisha, Osaka, Japan

[21] Appl. No.: 09/268,753

[22] Filed: Mar. 16, 1999

[30] Foreign Application Priority Data

Mar. 19, 1998 [JP] Japan .................................. 10-070263

[51] Int. Cl.⁷ .................................................. H02K 49/00
[52] U.S. Cl. ........................ 242/354; 310/103; 310/67 R; 242/356
[58] Field of Search ..................................... 310/268, 103, 310/105, 106, 67 R; 342/354, 356; 226/188, 194

[56] References Cited

U.S. PATENT DOCUMENTS

| | | |
|---|---|---|
| 4,423,359 | 12/1983 | Hashimoto . |
| 4,630,149 | 12/1986 | Ida . |
| 5,101,131 | 3/1992 | Ushiro et al. . |
| 5,481,418 | 1/1996 | Maikuma et al. ................... 242/356 X |
| 5,499,753 | 3/1996 | Yamazaki et al. ................... 310/354 X |
| 5,511,738 | 4/1996 | Seo et al. ................................ 310/356 |
| 5,721,460 | 2/1998 | Ushiro . |
| 5,760,521 | 6/1998 | Ushiro ................................. 310/67 R X |
| 5,863,008 | 1/1999 | Park ......................................... 242/356 |
| 5,887,812 | 3/1999 | Lauble et al. ...................... 242/356 X |
| 5,936,793 | 8/1999 | Koh et al. . |
| 5,999,358 | 12/1999 | Koguchi et al. .................... 242/356 X |

FOREIGN PATENT DOCUMENTS

| | | |
|---|---|---|
| 0431860A2 | 6/1991 | European Pat. Off. . |
| 58-207861 | 12/1983 | Japan . |
| 59-113750 | 6/1984 | Japan . |
| 5-182299 | 7/1993 | Japan . |
| 5-96921 | 12/1993 | Japan . |

*Primary Examiner*—Donald P. Walsh
*Assistant Examiner*—Collin A. Webb
*Attorney, Agent, or Firm*—Dike, Bronstein, Roberts & Cushman, LLP; David G. Conlin; William J. Daley, Jr.

[57] ABSTRACT

A capstan motor which includes: a stator yoke having a multiple number of coils provided on a circle centered about a rotational shaft; and a rotor yoke having an annular magnet opposing the multiple number of coils and rotating integrally with the rotational shaft, and is constructed such that a hysteresis plate is provided opposing the rotor yoke on the side opposite the multiple number of coils for receiving leakage of the magnetic flux from the magnet and is attached rotatably relative to the rotary shaft; and driving force for rotation is extracted from the hysteresis plate, and a tape driving system using it.

10 Claims, 9 Drawing Sheets

PRIOR ART

CAPSTAN MOTOR WITH HYSTERESIS PLATE AND DRIVE SYSTEM

BACKGROUND OF THE INVENTION (1) Field of the Invention

The present invention relates to a capstan motor for use in a video tape recorder, digital audio tape recorder, cassette tape recorder, etc.

(2) Description of the Prior Art

A conventional tape driving system for VTRs etc., needs to incorporate torque limiter mechanisms each having different limits, respectively for supply and takeup side reel tables. Therefore, the reel tables become complicated as to their structure and hence high in cost as well as becoming greater in weight and in height at the reel table portions. In order to solve these problems, methods of incorporating a limiter mechanism into a capstan motor have been disclosed (in, for example, Japanese Utility Model Application Laid-Open Hei 5 No. 96,921 and Japanese Patent Application Laid-Open Hei 5 No. 182,299).

Figure 1:
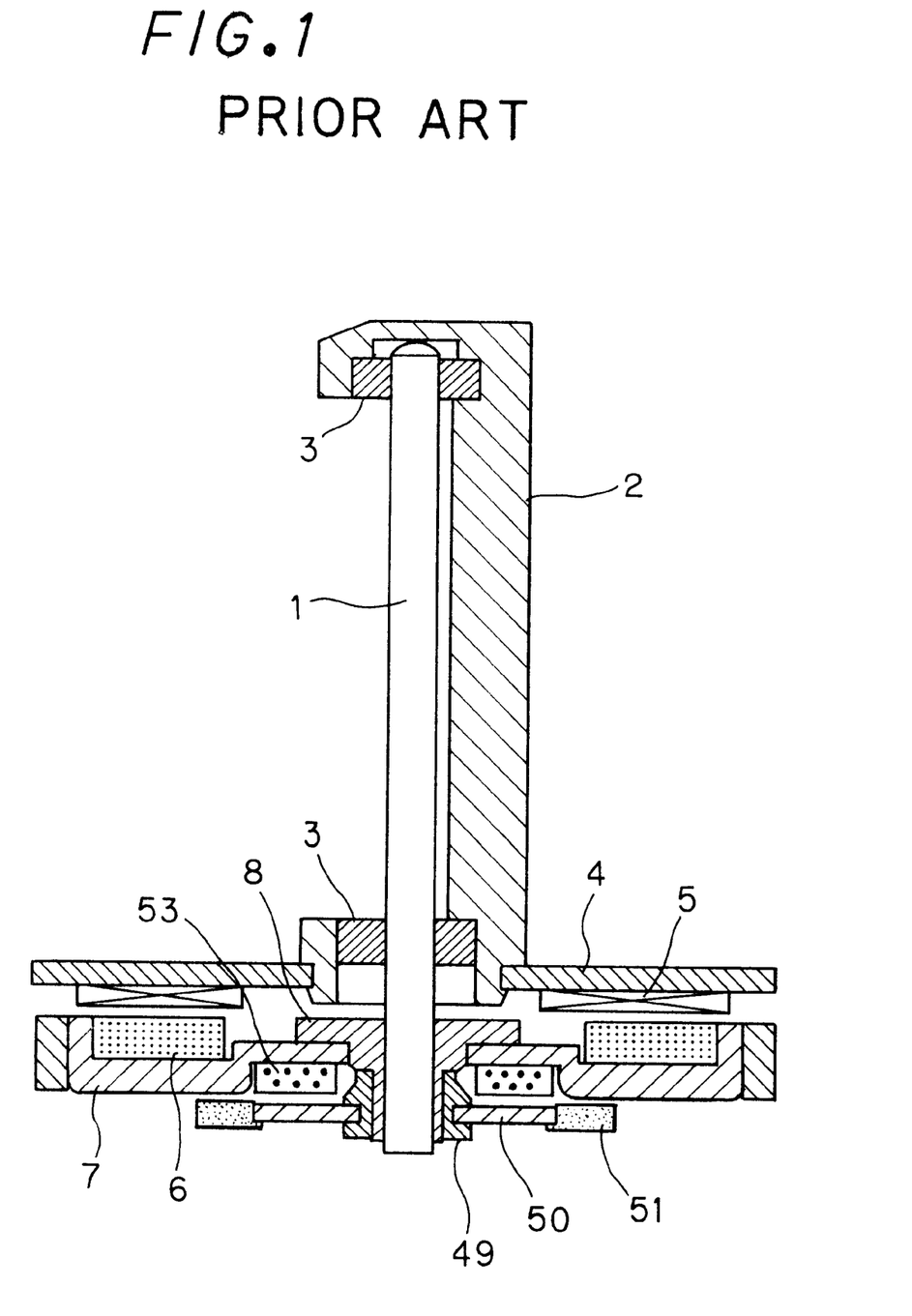
FIG. 1 is a sectional view showing a configuration of a conventional capstan motor.

A conventional example will be explained with reference to FIG. 1. In FIG. 1, a capstan shaft 1 is rotatably held in a housing 2 by a bearing 3. This housing 2 is fixed to a stator yoke 4. Fixed to stator yoke 4 on the side opposite to housing 2 is a coil 5. A boss 8 is press fitted on the lower portion of capstan shaft 1. This boss 8 has a rotor yoke 7 fixed thereto, on which a magnet 6 is attached opposing coil 5. A limiter magnet 53 is fixed on the bottom side of rotor yoke 7. A hysteresis plate 50 is rotatably attached relative to capstan shaft 1 so as to oppose the limiter magnet. This hysteresis plate has an output wheel 51 which is provided around the circumference of hysteresis plate 50 and allows mechanical power to be extracted.

According to this capstan motor, when rotor yoke 7 rotates, limiter magnet 53 also rotates, which produces a hysteresis torque in hysteresis plate 50, hence the plate 50 also rotates. This rotational force of hysteresis plate 50 is picked up through output wheel 51 for reel driving. This limiter portion can absorb the difference between the rotating speed of the reel which changes with the variation in the wound diameter of the tape on the reel and the rotational speed of the capstan motor which rotates at a fixed rate. Therefore, it is no longer necessary to provide any torque limiter in the takeup reel table.

Another conventional example will be described referring to FIG. 2. Description will be made of only parts which are different from the conventional example of FIG. 1, and the same or similar parts as in FIG. 1 will be allotted with the same reference numerals with no description. A coil fixing member 61 is used to attach a coil 5 to a stator yoke 4. A rotor yoke 7 is fixed to a capstan shaft 1 via a boss 8 so that a magnet 6 and a hysteresis plate 60 oppose each other with coil 5 in between. Hysteresis plate 60 is attached rotatably with respect to capstan shaft 1. A capstan gear 62 is provided around the circumference of the plate 60 so as to allow driving force to be extracted. As rotor yoke 7 rotates, this produces a hysteresis torque in hysteresis plate 60, hence capstan gear 62 also rotates. This rotational force of capstan gear 62 is used for reel driving. The rotating speed of the reel changes with the variation in the wound diameter of the tape on the reel while the capstan motor rotates at a fixed rate. The limiter portion can absorb this difference.

However, the above conventional configurations have the following problems. The method of FIG. 1, disclosed in Japanese Utility Model Application Laid-Open Hei 5 No. 96,921, needs an extra magnet 53 for limiting torque, in rotor yoke 7 of the capstan motor. This complicates the shape of rotor yoke 7 resulting in increased cost. Further, when a compact capstan motor is attempted, magnet 6 needs to be smaller than coil 5 because of the presence of torque limiter magnet 53; this may affect the motor characteristics.

Figure 2:
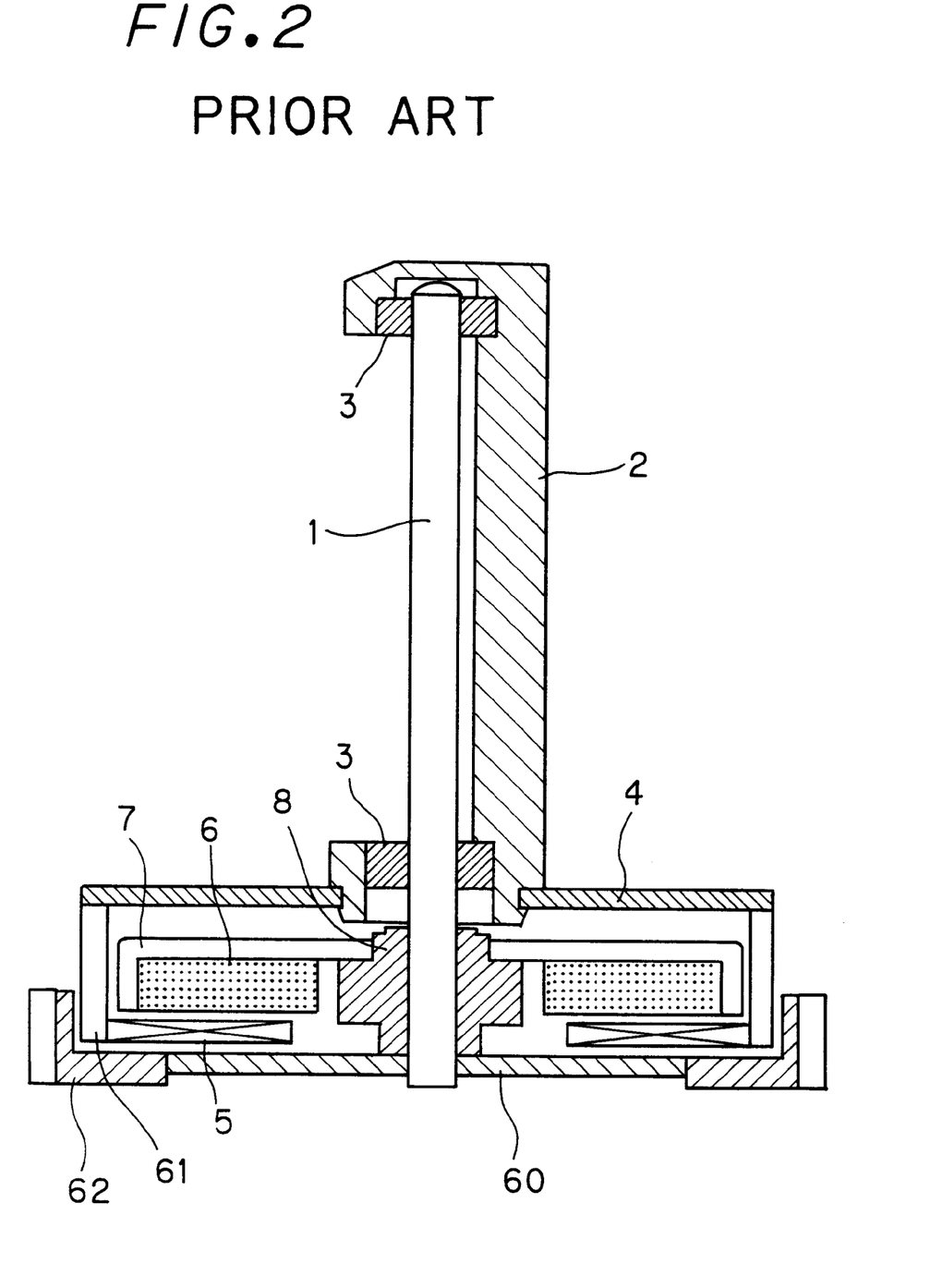
FIG. 2 is a sectional view showing a configuration of another conventional capstan motor.

Next, in the method of FIG. 2, disclosed in Japanese Patent Application Laid-Open Hei 5 No. 182,299, when no limiter torque occurs, rotor yoke 7 and hysteresis plate 60 integrally rotate. On the other hand, when the motor is used with limiting torque generated, hysteresis plate 60 rotates differently to rotor yoke 7, so that the magnetic flux passing through coil 5 varies to thereby affect the motor characteristics. Further, due to the magnetic characteristic unique to hysteresis plate 60, the motor characteristics will degrade. Moreover, since coil 5 is fixed to stator yoke 4 by means of coil fixing member 61, assembly of coil 5 needs to be done by controlling the central position of the coil and its gap with respect to the rotor yoke 7, needing a complicated arrangement with high precision.

SUMMARY OF THE INVENTION

The present invention provides the following means in order to solve the above problems. The present invention is configured as follows:

In accordance with the first aspect of the present invention, a capstan motor includes:

a stator yoke having a plurality of coils provided on a circle centered about a rotational shaft; and a rotor yoke having an annular magnet opposing the plurality of coils and rotating integrally with the rotational shaft, and is characterized in that a hysteresis plate is provided opposing the rotor yoke on the side opposite the plurality of coils for receiving leakage of the magnetic flux from the magnet and is attached rotatably relative to the rotary shaft; and driving force for rotation is extracted from the hysteresis plate.

In accordance with the second aspect of the present invention, the capstan motor having the above first feature is characterized in that the rotor yoke is configured of a non-magnetic material.

In accordance with the third aspect of the present invention, the capstan motor having the above first feature is characterized in that the rotor yoke is configured of a magnetic material, and the whole or part of the plate is formed with such a thickness that the magnetic flux from the magnet can leak therethrough to reach the hysteresis plate.

In accordance with the fourth aspect of the present invention, the capstan motor having any one of the above first through third features is characterized in that the area of the magnet is greater than that of the coils opposing the magnets.

In accordance with the fifth aspect of the present invention, the capstan motor having the above first feature is characterized in that the rotor yoke is configured of a magnetic material, and part of rotor yoke is cut away forming cutouts so as to allow the magnetic flux from the magnet to leak and reach the hysteresis plate through the cutouts.

In accordance with the sixth aspect of the present invention, a tape driving system includes:

a capstan motor comprising a stator yoke having a plurality of coils provided on a circle centered about a rotational shaft, and a rotor yoke having an annular magnet opposing the plurality of coils and rotating integrally with the rotational shaft, wherein a hysteresis plate is provided opposing the rotor yoke on the side opposite the plurality of coils for receiving leakage of the magnetic flux from the magnet and is attached rotatably relative to the rotary shaft; and driving force for rotation is extracted from the hysteresis plate;

a reel driving means which is rotationally driven by the hysteresis plate; and supply and takeup reel tables driven by the reel driving means.

In accordance with the seventh aspect of the present invention, the tape driving system having the above sixth feature is characterized in that the rotor yoke in the capstan motor is configured of a non-magnetic material.

In accordance with the eighth aspect of the present invention, the tape driving system having the above sixth feature is characterized in that the rotor yoke in the capstan motor is configured of a magnetic material, and the whole or part of the plate is formed with such a thickness that the magnetic flux from the magnet can leak therethrough to reach the hysteresis plate.

In accordance with the ninth aspect of the present invention, the tape driving system having any one of the above sixth through eighth features is characterized in that the area of the magnet is greater than that of the coils opposing the magnets.

In accordance with the tenth aspect of the present invention, the tape driving system having the above sixth feature is characterized in that the rotor yoke is configured of a magnetic material, and part of the rotor yoke is cut away forming cutouts so as to allow the magnetic flux from the magnet to leak and reach the hysteresis plate through the cutouts.

DESCRIPTION OF THE PREFERRED EMBODIMENTS

The embodiments of the present invention will hereinafter be described with reference to the accompanying drawings.

(The first embodiment)

Figure 3:
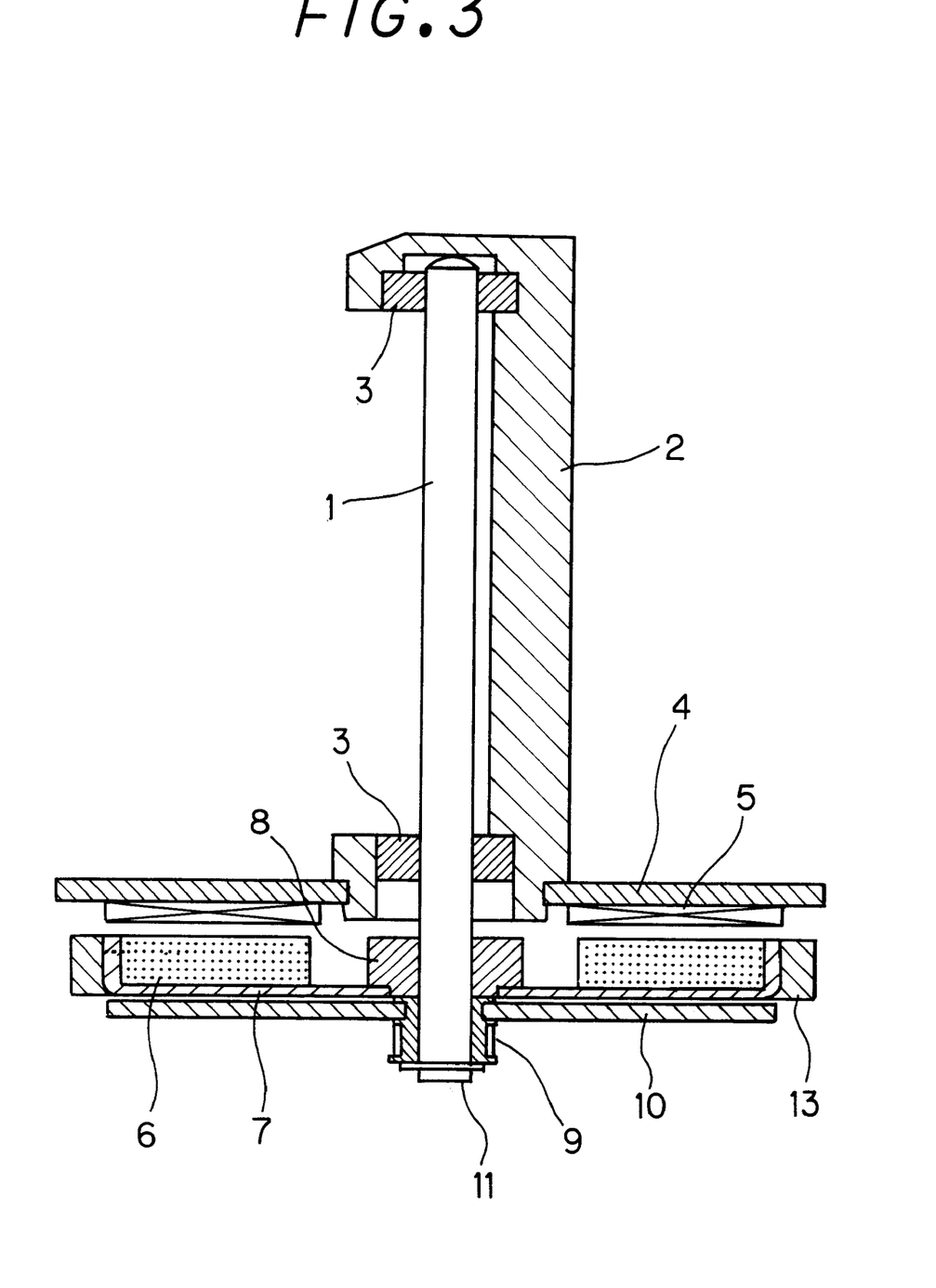
FIG. 3 is a sectional view showing a configuration of a capstan motor in accordance with the first embodiment of the present invention.

Referring to FIG. 3, the first embodiment of the present invention will be described. FIG. 3 shows a section of a capstan motor of the first embodiment of the present invention. In FIG. 3, a capstan shaft 1 is rotatably held in a housing 2 by a bearing 3. This housing 2 is fixed to a stator yoke 4. Fixed to stator yoke 4 on the side opposite to housing 2 is a coil 5. A boss 8 is press fitted on the lower portion of capstan shaft 1. This boss 8 has a rotor yoke 7 fixed thereto, on which a magnet 6 is attached opposing coil 5. Attached under rotor yoke 7 is a hysteresis plate 10 which is rotatable relative to capstan shaft 1. This hysteresis plate 10 has a timing pulley 9, and is attracted by the magnetic flux leaking from magnet 6 so as to be fixed to the rotor yoke 7 side. As a stopper to prevent drop-off upon being dropped stopper or the like, a washer 11 is provided, while a magnet 13 for generation of a rotation detection signal is provided on the outside periphery of rotor yoke 7.

Now, if a current flows through coil 5 to generate a magnetic field, magnet 6 which has been multi-pole magnetized within the plane, is repelled and attracted so that rotor yoke 7 and capstan shaft 1 rotate. The magnetic flux from magnet 6 leaks to the hysteresis plate 10 side. This leakage of magnetic flux produces a hysteresis torque acting on hysteresis plate 10, so that hysteresis plate 10 rotates together with rotor yoke 7 and capstan shaft 1. This rotational force is extracted through timing pulley 9 to drive the reel.

In a usual capstan motor having no hysteresis plate 10, rotor yoke 7 is composed of a magnetic material having a large enough thickness not to be magnetically saturated in order to decrease the leakage of magnetic flux outside the motor and also for the easy holding of magnet 6. However, in the present invention, it is necessary to leak a certain amount of magnetic flux to hysteresis plate 10 from magnet 6 in order to produce a hysteresis torque acting on hysteresis plate 10. The amount of mantic flux leaking to the hysteresis plate 10 side is determined depending upon the strength of the magnetic field of magnet 6, the material and plate thickness of rotor yoke 7, while the hysteresis torque acting on hysteresis plate 10 is determined by the material and plate thickness of hysteresis plate 10, the distance from rotor yoke 7 to hysteresis plate 10, and the like.

In FIG. 3, differing from the case of a usual capstan motor, the magnetic flux from magnet 6 can be well shielded by hysteresis plate 10. Therefore, rotor yoke 7 may be configured of a non-magnetic material. In this case, magnet 6 is attracted by hysteresis plate 10 toward the rotor yoke 7 side and held therein. If the retaining force is not high enough, magnet 6 is preferably fixed to rotor yoke 7 with an adhesive etc. The hysteresis torque acting on hysteresis plate 10 is determined by the strength of the magnetic field of magnet 6, the material and plate thickness of hysteresis plate 10, the distance from magnet 6 to hysteresis plate 10 and the like. That is, the torque will not be affected by the material and plate thickness of rotor yoke 7, this allows for easy design as compared to the case where rotor yoke 7 uses a magnetic material.

Figure 4A:
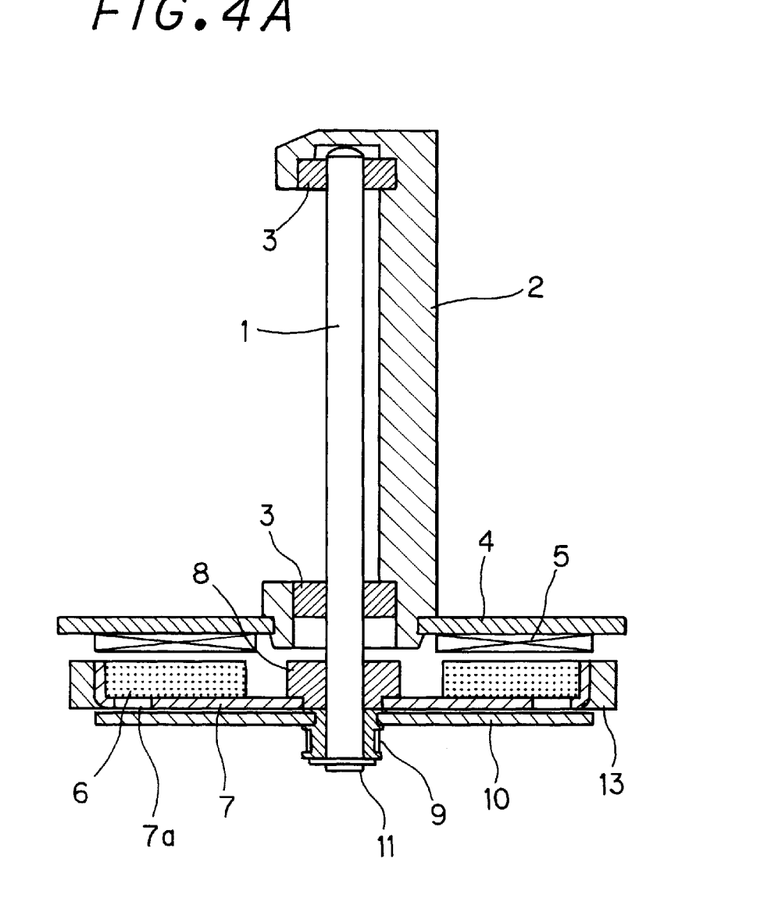
FIGS. 4A and 4B are views showing another configuration of a capstan motor in accordance with the first embodiment of the present invention.
Figure 4B:
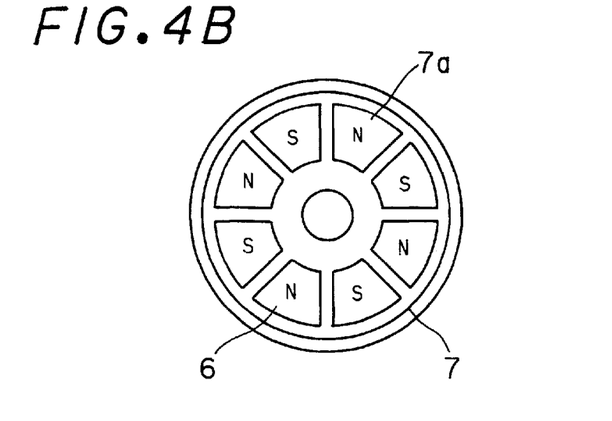

Also, as shown in FIG. 4A, rotor yoke 7 composed of magnetic material may be formed with cutouts 7a so that the magnetic flux leaks from magnet 6 to hysteresis plate 10 through cutouts 7a, thereby producing a hysteresis torque acting on hysteresis plate 10. In this case, it is not necessary to consider the material and thickness of the rotor yoke, while the amount of magnetic flux leaking from magnet 6 to hysteresis plate 10 can be controlled by adjusting the positions and size of cutouts 7a, thus making it possible to regulate the hysteresis torque acting on hysteresis plate 10. An example of cutouts 7a is shown in FIG. 4B, in which rotor yoke 7 is formed with cutouts 7a at positions corresponding to eight alternating N and S poles in magnet 6, with joining portions left between the poles.

The torque finally extracted from timing pulley 9 is the hysteresis torque acting on hysteresis plate 10 plus a frictional torque arising near the center of the shaft from the attraction of hysteresis plate 10. By setting these appropriately, the final torque can be set up at the predetermined value, to thereby determine the final torque acting on timing pulley 9 at a desired value. For example, suppose the slip torque at the takeup side reel table is 20 gf·cm and speed reduction ratio from the capstan motor to the reel table is 1/10, the transmission torque required for timing pulley 9 will be about 2 gf·cm or more, taking into account the transmission efficiency.

When a rotor yoke 7 composed of a mild steel material (JIS:SS400) of 0.5 mm thick is used, a neodymium magnet of 1 mm thick with a maximum energy product of 42 MOe is used as a magnet 6, a hysteresis plate 10 of 0.5 mm thick, a commercial metal product (YHJ-2: a product of Hitach Metals Ltd.) is used and the gap between rotor yoke 7 and the hysteresis plate is set at 0.2 mm, it is possible to generate a torque ranging from 2 to 3 gf·cm by controlling the magnetic characteristics of the hysteresis plate, thus meeting the aforementioned requirements. Since a strong magnet such as a rare earth magnet or the like is often used for magnet 6 of the capstan motor for, in particular, compact movie mechanics, the above feature allows a desired transmission torque to be set up easily.

The means for extraction of the driving force from the capstan motor is not limited to timing pulley 9 provided on the underside of hysteresis plate 10, but a gear, for example, may be used. It is also possible to provide a gear etc. on the outside periphery of hysteresis plate 10.

(The second embodiment)

Figure 5:
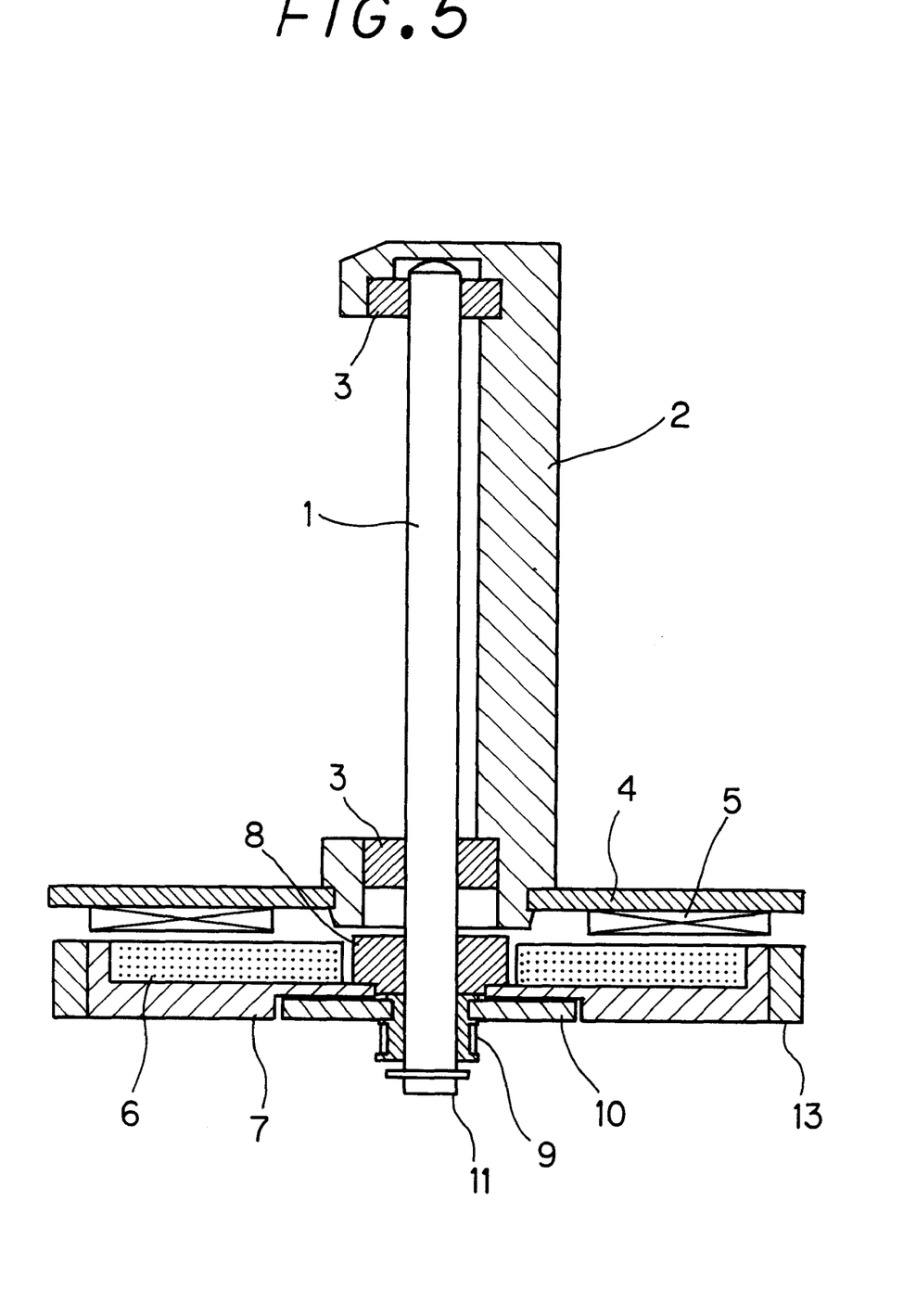
FIG. 5 is a sectional view showing a configuration of a capstan motor in accordance with the second embodiment of the present invention.

The second embodiment of the present invention will be described with reference to FIG. 5. FIG. 5 shows a section of a capstan motor of the second embodiment of the present invention. Now, the difference from FIG. 3 will be described. Magnet 6 is an annular flat plate and is configured such that it extends inwardly toward the center of the rotary shaft, exceeding the portion opposing coil 5, for generating a driving force as a motor. A hysteresis plate 10 is arranged corresponding to this extended portion, where it opposes magnet 6 of rotor yoke 7. Rotor yoke 7 may be formed of a magnetic or non-magnetic material, as in the case of FIG. 3. In particular, when a magnetic material is used for rotor yoke 7, leakage of the magnetic flux from magnet 6 to the hysteresis plate 10 side may be enhanced by forming a rotor yoke 7 with a reduced thickness in the central portion.

In accordance with the present embodiment, it is not necessary to use any extra limiter magnet 53 as used in the conventional example shown in FIG. 1. Further, hysteresis plate 10 is disposed in the area other than the area where coil 5 opposes magnet 6. Therefore, it is possible to exclude the possibility of the torque limiter structure adversely affecting the motor characteristics.

(The third embodiment)

Figure 6:
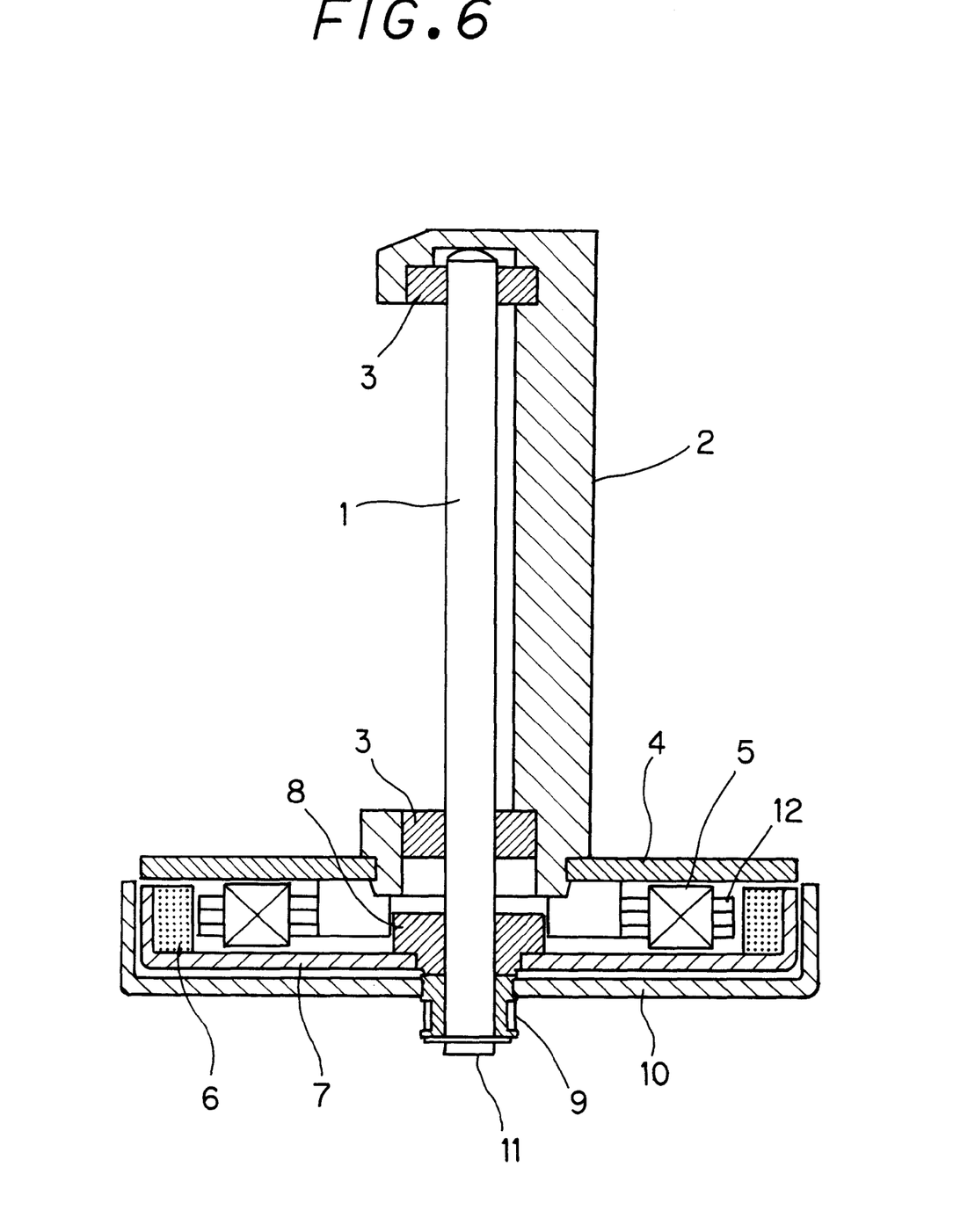
FIG. 6 is a sectional view showing a configuration of a capstan motor in accordance with third embodiment of the present invention.

The third embodiment of the present invention will be described with reference to FIG. 6. FIG. 6 shows a section of a capstan motor of the third embodiment of the present invention. FIG. 3 shows an example of a disc opposed motor, whereas FIG. 6 shows a case of a rim opposed motor. In FIG. 6, a capstan shaft 1 is rotatably held in a housing 2 by a bearing 3. This housing 2 is fixed to a stator 4. Fixed to stator 4 on the side opposite to housing 2 is a core 12 on which a coil 5 is wound. A boss 8 is press fitted on the lower portion of capstan shaft 1. This boss 8 has a rotor yoke 7 fixed thereto. A magnet 6 is attached to the inner periphery of rotor yoke 7 so as to oppose core 12. A hysteresis plate 10 which is rotatable relative to capstan shaft 1 is attached outside rotor yoke 7 which is located around the outside periphery of magnet 6. This hysteresis plate 10 has a timing pulley 9. As a stopper to prevent drop-off, a washer 11 is provided. The limiting torque generating mechanism is the same as the case in FIG. 3.

Similarly to the case of FIG. 3, when rotor yoke 7 is formed of magnetic material, the amount of mantic flux leaking to the hysteresis plate 10 side is set up by adjusting the strength of the magnetic field of magnet 6, the material and plate thickness of rotor yoke 7. In the case of this embodiment, it is not necessary to configure the entire part of hysteresis plate 10 with a magnetic material, but only the part corresponding to the outside of rotor 7 located on the outside periphery of magnet 6 may be formed of a magnetic material. On the other hand, when rotor yoke 7 is formed with a non-magnetic material, the amount of magnetic flux leaking to hysteresis plate 10 is set up by adjusting the magnetic strength of magnet 6 and the distance from magnet 6 to hysteresis plate 10 and the like.

Figure 7:
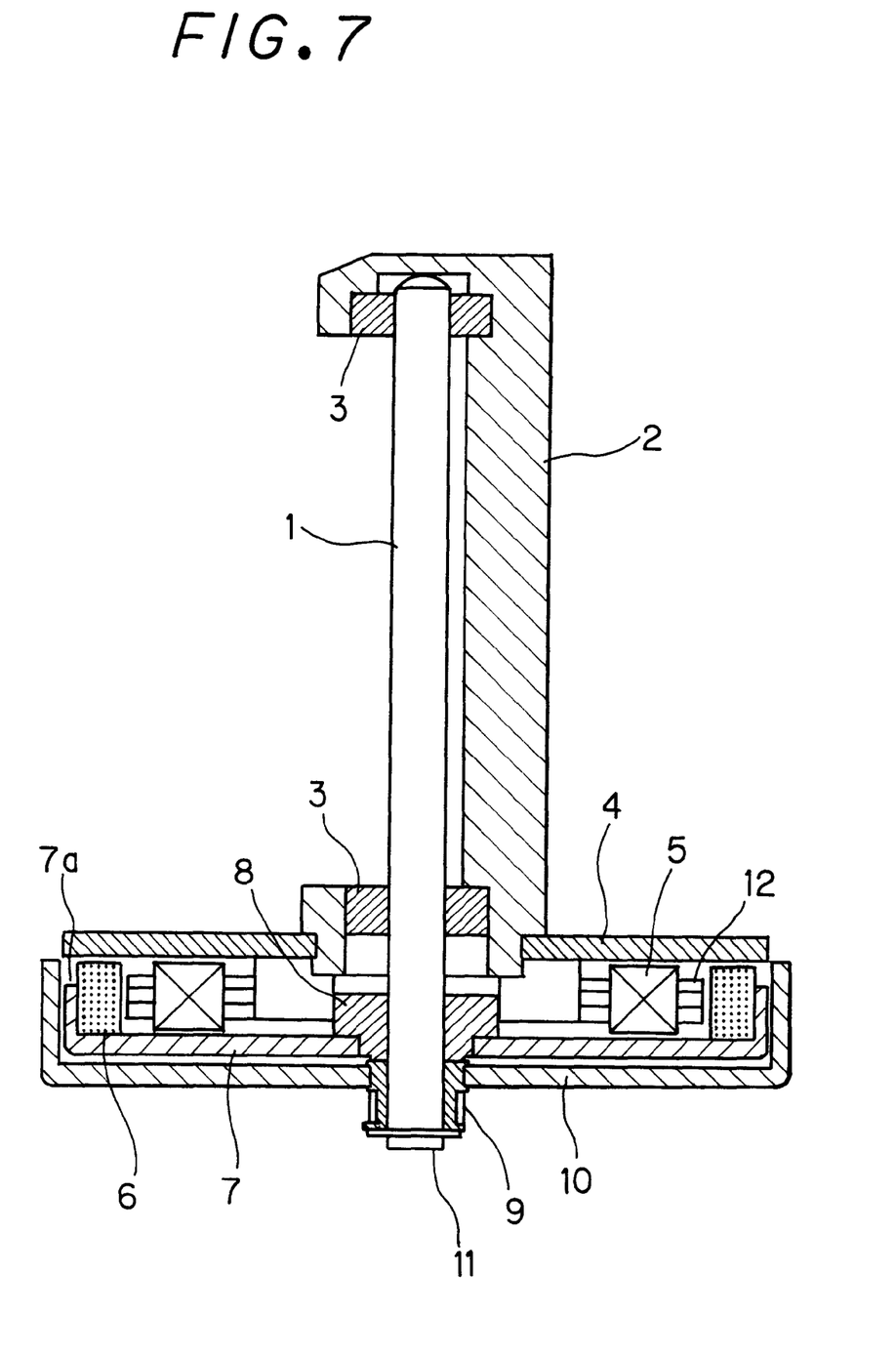
FIG. 7 is a sectional view showing another configuration of a capstan motor in accordance with the third embodiment of the present invention.

Further, as shown in FIG. 7, when rotor yoke 7 is configured of a magnetic material, cutouts 7a may be formed in part in rotor yoke 7 on the outside periphery of magnet 6 so that the magnetic flux leaks from magnet 6 to hysteresis plate 10 through cutouts 7a, thereby producing a hysteresis torque acting on hysteresis plate 10. In this case, it is not necessary to consider the material and thickness of the rotor yoke, while the amount of magnetic flux leaking from magnet 6 to hysteresis plate 10 can be controlled by adjusting the positions and size of cutouts 7a, thus making it possible to regulate the hysteresis torque acting on hysteresis plate 10. An example of cutout 7a can be realized by uniformly reducing the height of rotor yoke 7 on the outside periphery of magnet 6. This configuration of cutout 7a is simplified compared to a motor having the structure shown in FIG. 4.

It is expected that the area of hysteresis plate 10 opposing magnet 6 in the case of FIG. 6 is slightly less than the case of FIG. 3. However, the position at which the force arises is further from the rotational center. Resultantly, the output torque will not change very much.

(The fourth embodiment)

Figure 8:
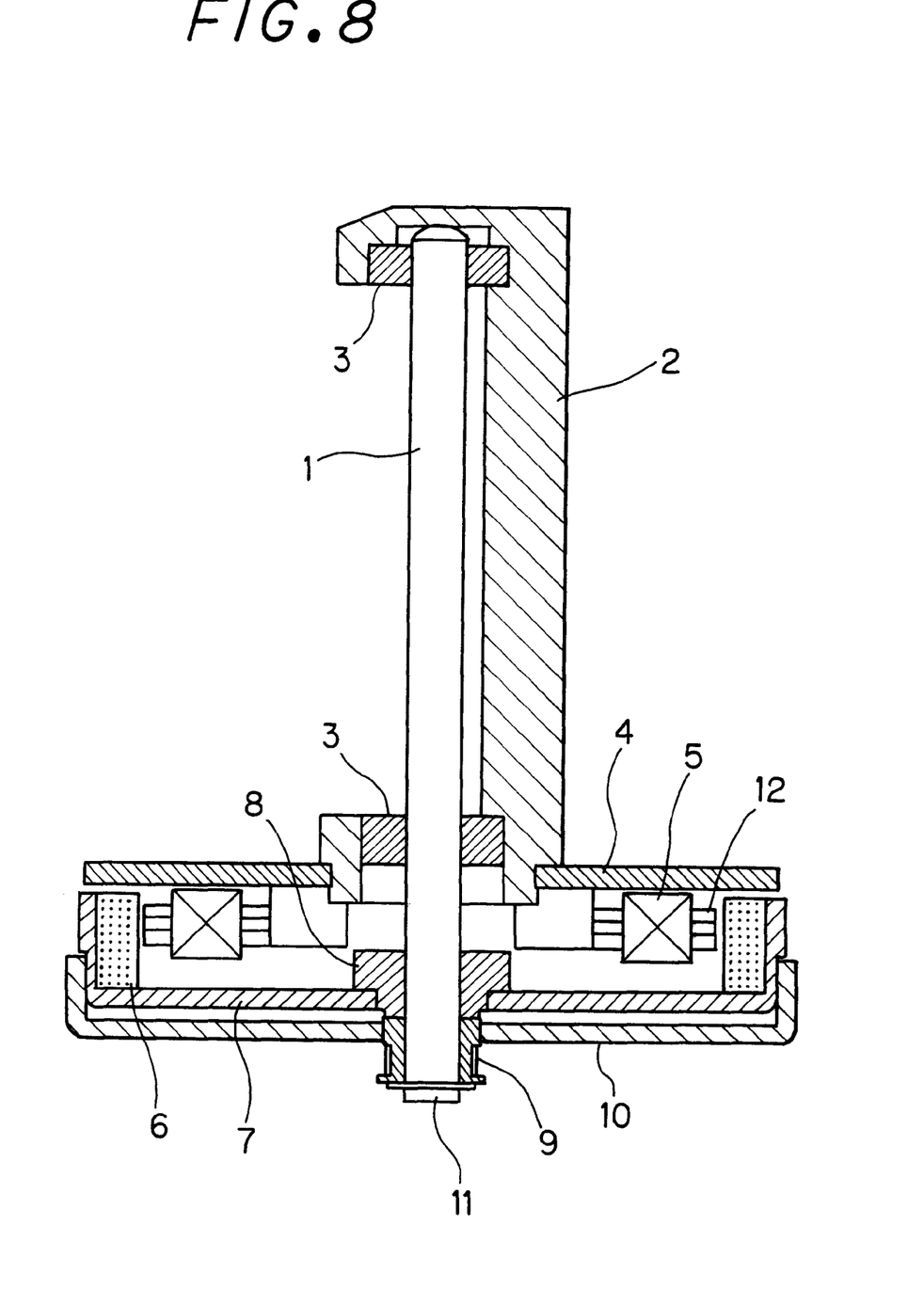
FIG. 8 is a sectional view showing a configuration of a capstan motor in accordance with fourth embodiment of the present invention.

The fourth embodiment of the present invention will be described with reference to FIG. 8. FIG. 8 shows a section of a capstan motor of the fourth embodiment of the present invention. Now, the difference from FIG. 6 will be described. Magnet 6 is an annular cylinder, and is configured such that it extends greater in its height, exceeding the portion opposing coil 5 for generating driving force as a motor. A hysteresis plate 10 is arranged corresponding to this extended portion, around the outside portion of rotor yoke 7 located on the outside periphery of magnet 6. Rotor yoke 7 may be formed of a magnetic or non-magnetic material, as in the case of FIG. 6. In particular, when a magnetic material is used for rotor yoke 7, leakage of the magnetic flux from magnet 6 to the hysteresis plate 10 side may be enhanced by forming a rotor yoke 7 with a reduced thickness in the portion corresponding to the extended portion of magnet 6.

In accordance with the present embodiment, it is not necessary to use any extra limiter magnet 53 as used in the conventional example shown in FIG. 1. Further, hysteresis plate 10 is disposed in the area other than the area where coil 5 opposes magnet 6. Therefore, it is possible to exclude the possibility of the torque limiter structure adversely affecting the motor characteristics.

(The fifth embodiment)

Figure 9:
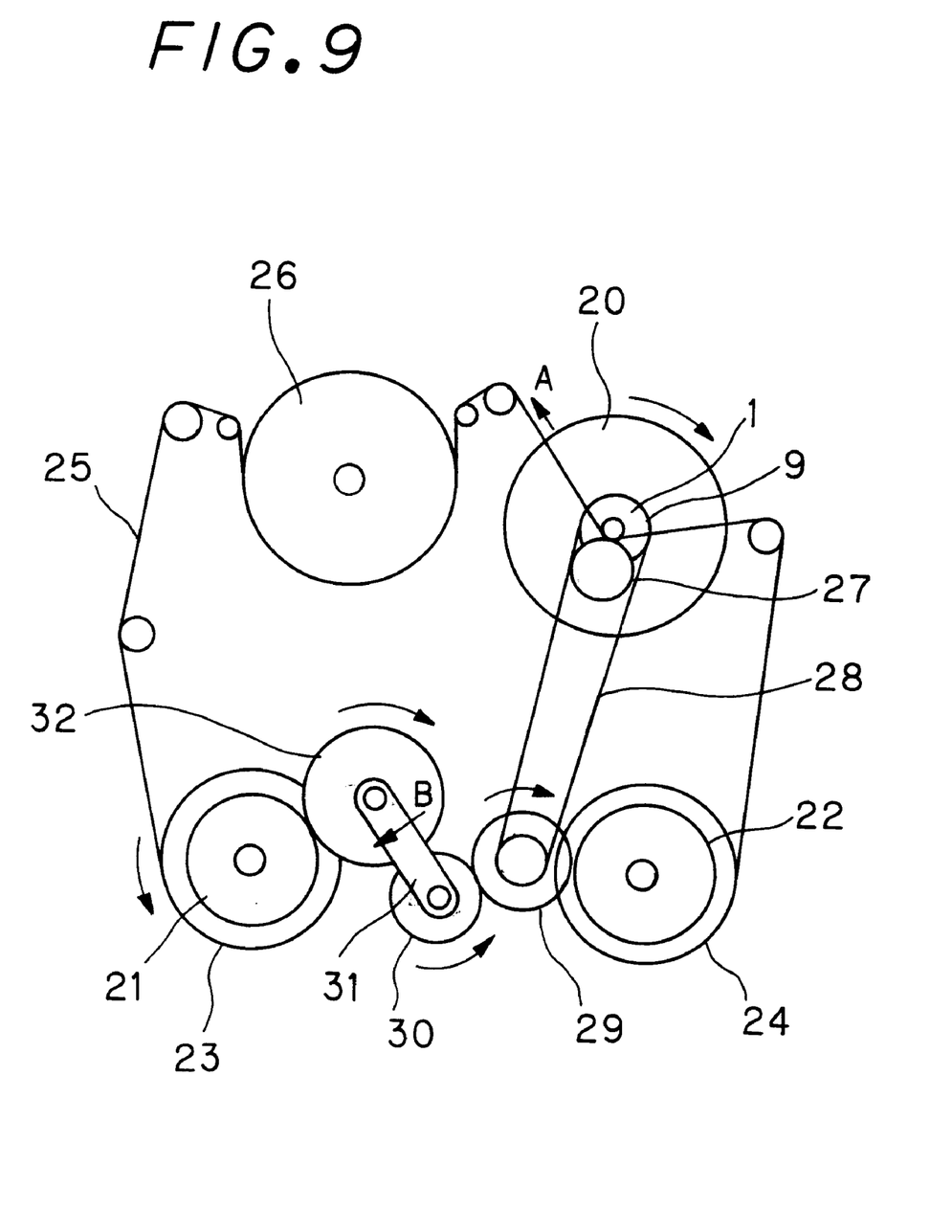
FIG. 9 is an illustrative view schematically showing a tape driving system and reel driving system with the embodiment of the present invention incorporated therein.

Referring to FIG. 9, a tape driving system and reel driving system incorporating a capstan motor of the present invention will be described. This example is a case of a VTR tape driving system and illustrates a power transmission method of the reel driving system during tape rewinding, with the operating directions of the diverse components.

A capstan motor 20 of the present invention, one of the first through fourth embodiments, provides driving force to the reel driving system by way of a timing pulley 9, a timing belt 28 and a coupling gear 29 to a center gear 30. A swing arm 31 has felt or the like which receives a swing torque from center gear 30. That is, as center gear 30 rotates, swing arm 31 rotates in accordance with the rotational direction of gear 30, to thereby cause an idler 32 to mesh with a S-reel table 21 or T-reel table 22 for power transmission. Thus, a supply reel 23 or takeup reel 24 can be driven.

Now, the operation during tape rewinding will be described. Tape 25 spooled off from takeup reel 24 is driven in the direction of arrow A in the figure by means of capstan shaft 1 and a pinch roller 27 and is wound around a drum 26 to reach supply reel 23 and is taken up thereby. Capstan motor 20 rotates in the direction of the arrow in the figure. The power from capstan motor 20 is extracted through timing pulley 9, which in turn is transmitted to center gear 30 by way of timing belt 28 and coupling gear 29. Swing arm 31 has felt or the like which receives a swing torque from center gear 30. Center gear 30 rotates swing arm 31 in the direction of arrow B in the figure so that idler 32 becomes meshed with S-reel table 21 so as to transmit power to S-reel table 21. As S-reel table 21 in connection with supply reel 23 rotates, supply reel 23 rotates in the direction of the arrow in the figure to thereby take up tape 25.

During this operation, since tape 25 is taken up by supply reel 23, the rotational rate changes with the variation of the wound diameter. On the other hand, the rotating rate of capstan motor 20 is fixed so that the speed of the tape conveyed by capstan shaft 1 and pinch roller 27 is constant. The rotational rate of supply reel 23 for taking up tape 25 is in general set so that the reel can take up faster, even at the time of minimum reel diameter, than the speed of the tape conveyed by capstan shaft 1 and pinch roller 27. Accordingly, slipping occurs at the torque limiter device provided in capstan motor 20. In this way, it is possible for capstan motor 20 incorporating the torque limiter mechanism to rotate supply reel 23 with the predetermined torque so as to impart a tension which allows tape 25 to be held to rotational drum 26 and to produce a limiting torque to allow supply reel 23 to take up tape 25 without slack.

Next, the operation during tape playback will be described. During tape playback, each element in the figure is driven in the direction opposite to the arrow in the drawing; swing arm 31 moves over to T-reel table 22 side. Tape 25 goes out from supply reel 23 and is wound around drum 26 and driven by capstan shaft 1 and pinch roller 27 to the direction opposite the direction of arrow A in the figure, and is taken up by takeup reel 24. During this operation the power from capstan motor 20 is transmitted to center gear 30 by way of timing pulley 9, timing belt 28 and coupling gear 29. Center gear 30 rotates swing arm 31 so that idler 32 meshes with T-reel table 22 to thereby transfer the power to T-reel table 22. As T-reel table 22 coupled with takeup reel 24 rotates, takeup reel 24 takes up tape 25. T-reel table 22 incorporates a torque limiter. The required torque for this torque limiter may be as small as about 7 g·cm, for example, which allows takeup reel 24 to take up tape 25 driven by capstan shaft 1 and pinch roller 27. Therefore, the difference of the speed between capstan motor 20 and takeup reel 24 is absorbed by the slippage of the torque limiter portion incorporated in T-reel table 23, not by timing pulley 9.

As has been described, according to the present invention, leakage of the magnetic flux from the drive magnet of the capstan motor is used. Therefore there is no need to provide a torque limiter generating magnet as used in the conventional art, thus reducing the cost. Since the magnetic flux leaking onto the side opposite the coil is used, it is possible to generate a hysteresis torque acting on the hysteresis plate having little influence on the motor characteristics. Further, it is possible to provide an inexpensive capstan motor incorporating a torque limiter, which is free from complexity as to its structure and can be assembled easily. There is no need of a torque limiter for the S-reel table so that this gives better margins as to the height dimensions. Accordingly, it is possible to reserve an ample space for winding the tension band, and hence it is possible to make the entire tape driver thin.

What is claimed is:

1. A capstan motor comprising:
   a stator yoke having a plurality of coils provided on a circle centered about a rotational shaft;
   a rotor yoke having an annular magnet opposing the plurality of coils and rotating integrally with the rotational shaft;
   a hysteresis plate being provided opposing the rotor yoke on the side opposite the plurality of coils and being attached rotatably relative to the rotary shaft; and
   wherein the rotor yoke is configured so that at least a part of the rotor yoke plate is formed with such a thickness that magnetic flux from the magnet can leak therethrough to reach the hysteresis plate.

2. The capstan motor according to claim 1, wherein the whole of the plate is formed with such a thickness that magnetic flux from the magnet can leak therethrough to reach the hysteresis plate.

3. The capstan motor according to claim 1, wherein a driving force for rotation is extracted from the hysteresis plate.

4. A tape driving system comprising:
   a capstan motor including a stator yoke having a plurality of coils provided on a circle centered about a rotational shaft, a rotor yoke having an annular magnet opposing the plurality of coils and rotating integrally with the rotational shaft, and a hysteresis plate being provided opposing the rotor yoke on the side opposite the plurality of coils and being attached rotatably relative to the rotary shaft, wherein the rotor yoke is configured so that at least a part of the rotor yoke plate is formed with such a thickness that magnetic flux from the magnet can leak therethrough to reach the hysteresis plate;
   a reel driving means which is rotationally driven by the hysteresis plate; and
   supply and takeup reel tables driven by the reel driving means.

5. The tape driving system according to claim 4, wherein the whole of the plate is formed with such a thickness that magnetic flux from the magnet can leak therethrough to reach the hysteresis plate.

6. The tape driving system according to claim 4, wherein a driving force for rotation is extracted from the hysteresis plate.

7. A capstan motor comprising:

a stator yoke having a plurality of coils provided on a circle centered about a rotational shaft;

a rotor yoke having an annular magnet opposing the plurality of coils and rotating integrally with the rotational shaft;

a hysteresis plate being provided opposing the rotor yoke on the side opposite the plurality of coils and being attached rotatably relative to the rotary shaft; and wherein part of the rotor yoke is cut away forming cutouts so as to allow magnetic flux from the magnet to leak and reach the hysteresis plate through the cutouts.

8. A capstan motor comprising:

a stator yoke having a plurality of coils provided on a circle centered about a rotational shaft;

a rotor yoke having an annular magnet opposing the plurality of coils and rotating integrally with the rotational shaft;

a hysteresis plate being provided opposing the rotor yoke on the side opposite the plurality of coils and being attached rotatably relative to the rotary shaft; and wherein an area of the magnet is greater than that of the coils opposing the magnet so as to allow magnetic flux from a portion of the magnet not opposing the plurality of coils to leak through the rotor yoke and reach the hysteresis plate.

9. A tape driving system comprising:

a capstan motor including a stator yoke having a plurality of coils provided on a circle centered about a rotational shaft, a rotor yoke having an annular magnet opposing the plurality of coils and rotating integrally with the rotational shaft, and a hysteresis plate being provided opposing the rotor yoke on the side opposite the plurality of coils and being attached rotatably relative to the rotary shaft, wherein part of the rotor yoke is cut away forming cutouts so as to allow magnetic flux from the magnet to leak and reach the hysteresis plate through the cutouts;

a reel driving means which is rotationally driven by the hysteresis plate; and supply and takeup reel tables driven by the reel driving means.

10. A tape driving system comprising:

a capstan motor including a stator yoke having a plurality of coils provided on a circle centered about a rotational shaft, a rotor yoke having an annular magnet opposing the plurality of coils and rotating integrally with the rotational shaft, and a hysteresis plate being provided opposing the rotor yoke on the side opposite the plurality of coils and being attached rotatably relative to the rotary shaft, wherein an area of the magnet is greater than that of the coils opposing the magnet so as to allow magnetic flux from a portion of the magnet not opposing the plurality of coils to leak through the rotor yoke and reach the hysteresis plate;

a reel driving means which is rotationally driven by the hysteresis plate; and supply and takeup reel tables driven by the reel driving means.

* * * * *